UNITED STATES PATENT OFFICE.

ANDREW BRIGGS, OF LAWRENCE, MASSACHUSETTS.

IMPROVED COMPOSITION FOR WELDING STEEL.

Specification forming part of Letters Patent No. 38,554, dated May 19, 1863; antedated August 8, 1862.

*To all whom it may concern:*

Be it known that I, ANDREW BRIGGS, of Lawrence, in the county of Essex and Commonwealth of Massachusetts, have invented a new and Improved Compound for Purifying, Toughening, and Welding Steel; and I hereby declare that the following is a full and exact description thereof, and the exact amount of each ingredient which composes the compound.

The following are the ingredients which compose the compound and the several proportions of each, viz: borax, five ounces; sal-ammoniac, one and one-fourth ounce; prussiate of potash, one-half ounce; clay, one-half ounce; rosin, one-fourth ounce; alcohol, one-eighth pint; water, one-eighth pint. These are to be all mixed together and subjected to a heat sufficient to boil.

The manner of using my invention is to sprinkle onto the steel (that part which is to be used) a little of the compound. Then give the steel a proper heat, and by using the hammer in the usual way two pieces of steel are welded together in the most perfect manner.

By the use of my compound inferior steel may be used and do as good work and service as the best steel will do in the ordinary way of working it. A break or flaw in the edge of a chisel, ax, or other tool may be mended by sprinkling the broken part with the compound, heating the steel, and pounding with the hammer. So two pieces of steel may be welded by putting the square ends together, (the compound sprinkled between them,) with heating and hammering.

I do not claim that my compound will save labor in hammering or expense in heating, for these are to be done in the usual way; but it will enable the blacksmith to use any kind of steel and still make good work. It will not take so much time to prepare the steel for welding in pounding the pieces so as to lap each other, and it will not require so much care in heating, and still be always sure of a good weld.

I do not know the chemical action of my compound when applied to steel; but I know its effect by experimental use in working steel.

I claim—

The composition of matter consisting of the above-named ingredients, substantially as described, and for the purpose set forth.

ANDREW BRIGGS. [L. S.]

In presence of—
   JAMES K. BARKER,
   E. D. HAYES.